Nov. 24, 1953  W. S. PATTERSON  2,660,235
BURNER FOR CONVERTING NATURAL GAS INTO GASOLINE COMPONENTS
Filed July 24, 1947  4 Sheets-Sheet 1

INVENTOR
W. S. Patterson
BY
ATTORNEYS

Nov. 24, 1953 W. S. PATTERSON 2,660,235
BURNER FOR CONVERTING NATURAL GAS INTO GASOLINE COMPONENTS
Filed July 24, 1947 4 Sheets-Sheet 3
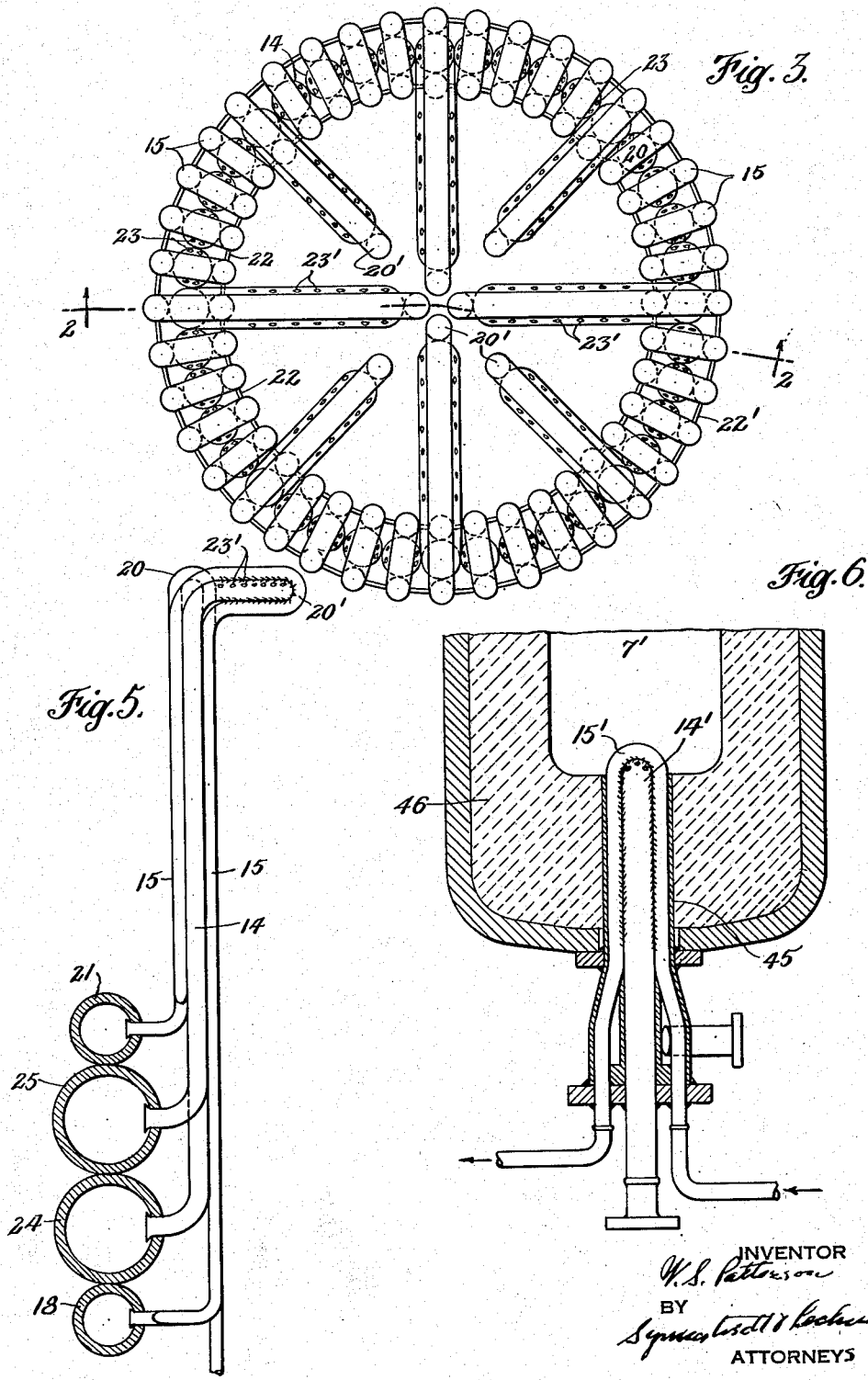

Nov. 24, 1953     W. S. PATTERSON     2,660,235
BURNER FOR CONVERTING NATURAL GAS INTO GASOLINE COMPONENTS
Filed July 24, 1947     4 Sheets-Sheet 4
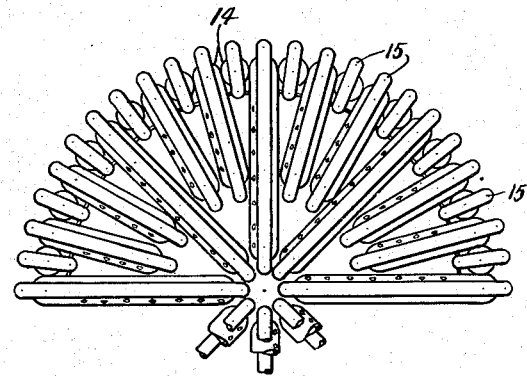
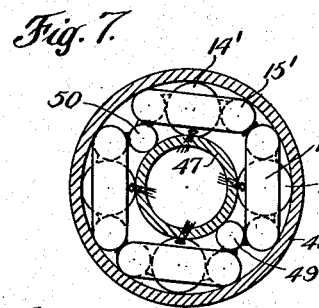
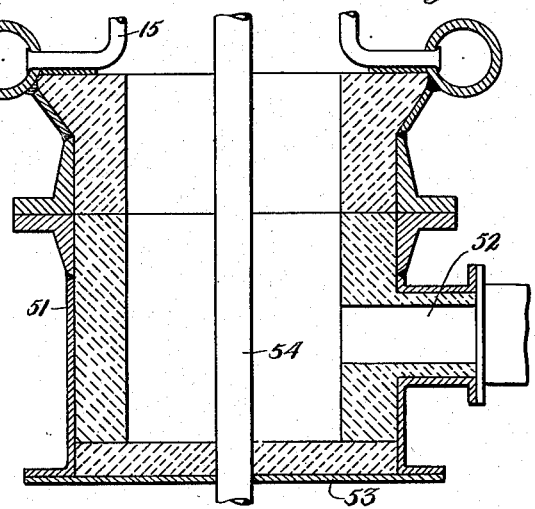
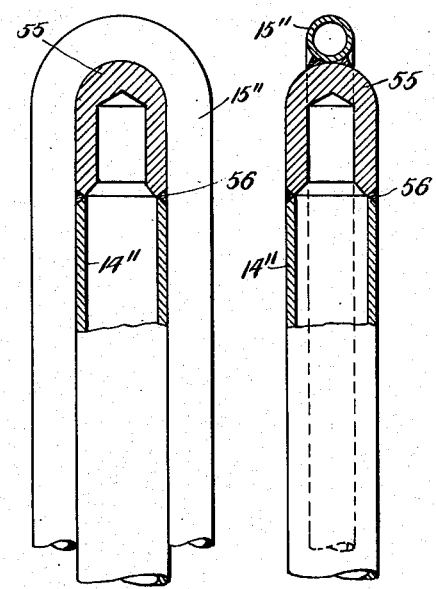
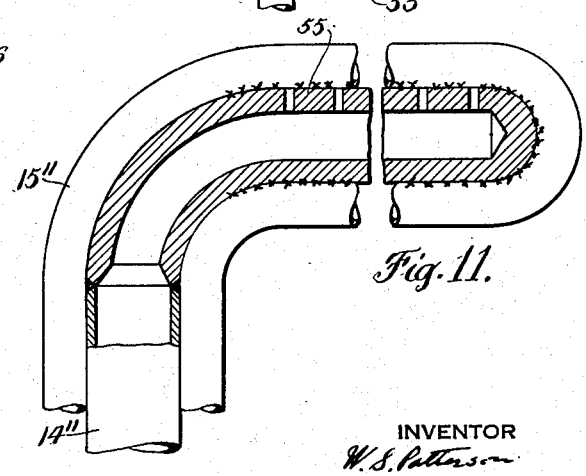
INVENTOR
W. S. Patterson
BY
ATTORNEYS Patented Nov. 24, 1953

2,660,235

UNITED STATES PATENT OFFICE 2,660,235

BURNER FOR CONVERTING NATURAL GAS INTO GASOLINE COMPONENTS

Ward S. Patterson, Chappaqua, N. Y., assignor to Combustion Engineering, Inc., a corporation of Delaware Application July 24, 1947, Serial No. 763,343

19 Claims. (Cl. 158—99)

This invention relates to the art of converting natural gas into other fuel gases, such as ethane, and high octane gasoline components, such as octene, hereinafter referred to generally as gasoline. (In this conversion additional substances are obtained as by-products, such as ethyl alcohol and fuels such as diesel oil.) Generally considered, the first step in the processing of the natural gas to make these conversions, is to burn the gas in a furnace or so-called generator under a reducing atmosphere to convert the gas, which is very largely methane ($CH_4$), into carbon monoxide ($CO$) and hydrogen ($H_2$). The next step, generally considered, is to rearrange the carbon monoxide and hydrogen produced in the generator to form products such as above described, this being done by catalysis in a so-called synthesis reactor.

The invention has to do with the first step. In this step, the natural gas is preheated to a relatively high temperature, usually to approximately 1200° F., and is introduced into the generator under superatmospheric pressure, usually in the neighborhood of from about 265 to about 300 p. s. i. As the oxidant or supporter of combustion, oxygen is desirably employed and is introduced into the heated natural gas to be burned in the generator, in an amount insufficient to support complete combustion, i. e., in an amount to maintain a reducing atmosphere. The oxygen, usually of about 95% to 99% purity, is also introduced at substantially the same pressure at which the generator is operated and likewise it is preheated. The temperature to which the oxygen is preheated is also relatively high, but not high enough to rapidly oxidize the metal when properly protected from heat sources. I usually employ a temperature of about 600° F., but with adequate cooling protection of the burner parts in contact with the oxygen and exposed to external heat and with proper choice of metals for the parts, oxygen temperatures in excess of 600° F. may be employed.

It will be seen that the foregoing operating conditions are very severe, in fact so severe that the provision of a burner which will withstand them presents a difficult problem. Heretofore, the process has only been carried out in relatively small installations somewhat of the order of pilot plants.

One of the primary objects of the invention is to provide effective burner mechanism, associated with a generator, whereby it is possible to operate the process commercially, on a large scale.

Such a gas generator and waste heat boiler is the subject matter of application Serial No. 34,678, filed June 23, 1948 (a continuation-in-part of the instant case) now Patent 2,603,559.

How the foregoing, together with such other objects and advantages as may hereinafter appear or are incident to the invention are realized is illustrated in the accompanying drawings, wherein—

Fig. 3 is a plan view of the burner of Fig. 2, drawn on a still larger scale;

Fig. 4 is a plan view of a modified form of burner;

Fig. 5 is a view illustrating a modification of one of the units of the burner shown in Figs. 2 and 3;

Fig. 6 is a view illustrating a burner adapted for very small installations such as a pilot plant, but embodying the principles of construction of the burner of Figs. 2 and 3;

Fig. 7 is a cross-sectional view of another modification of the burner suitable for small installations or for test purposes;

Fig. 8 is a sectional view illustrating a modified method of coupling the burner to the source of natural gas;

Figs. 9, 10 and 11 are fragmentary sectional views illustrating a modification of the tip ends of the oxygen tubes.

Figure 1:
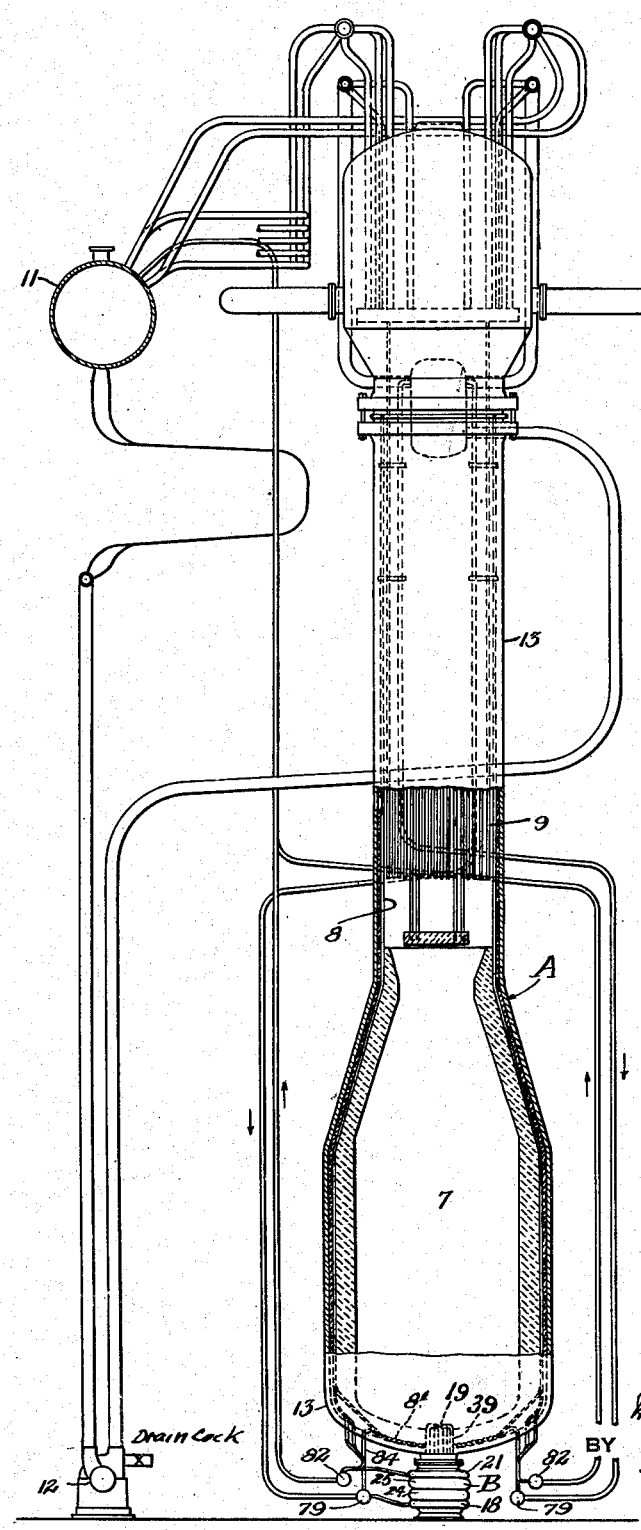
Fig. 1 is a more or less diagrammatic side elevation, partially in section, of the generator and burner mechanism embodying my invention.

Referring now to Fig. 1, the reference character A indicates the generator and the reference character B the burner. The generator will not be described in detail as it is adequately covered in the above referred to patent. It will here suffice to point out that it is about 70 feet in height and about 11 feet in outside diameter at the combustion chamber 7. Associated with the generator is a waste heat boiler for generating steam, including such parts, for example, as the water wall boiler tubes 8, the boiler tubes 9, the steam and water drum 11, the circulating pump 12 and appropriate connections. The generator has a pressure tight casing 13 preferably of drum sections welded together.

Figure 2:
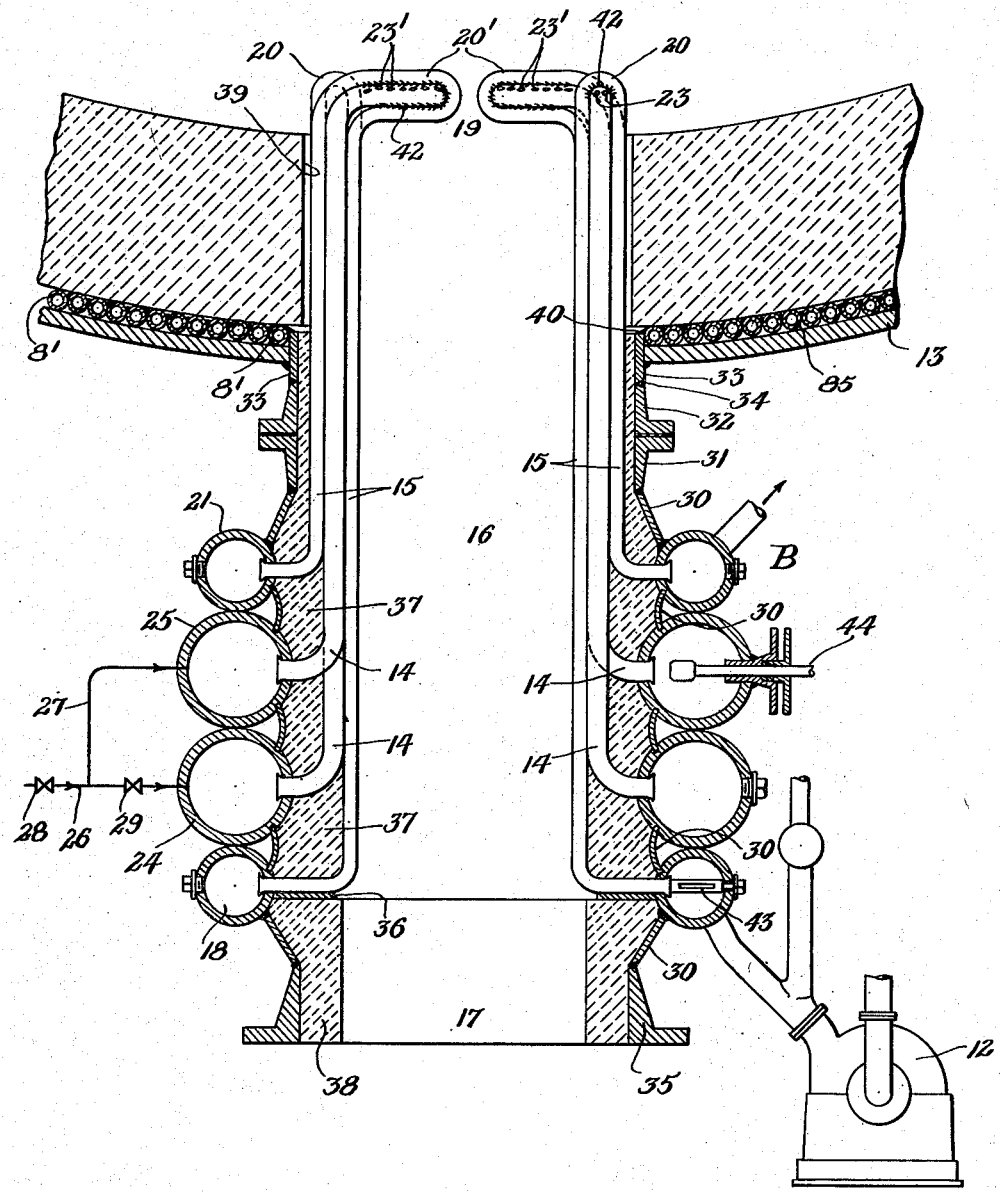
Fig. 2 is a vertical section through the burner, drawn on an enlarged scale and taken on the line 2—2 of Fig. 3.

Referring now to Figs. 2 and 3, the burner will be described. The body of the burner is in large part composed of and formed by the oxygen delivering tubes 14 and the cooling water tubes 15. These tubes it will be seen are annularly arranged as shown in Fig. 3, so as to provide a central burner passage 16 for the preheated natural gas to be processed, which gas is delivered to the inlet end 17 of the burner from a suitable source and by suitable connections (not shown). The inlet ends of the cooling water tubes 15 are connected to the header 18 from which the tubes receive their cooling water. The header is preferably ring-like, i. e., doughnut-shaped, and surrounds the body of the burner. The tubes 15 extend radially inwardly from the header and then upwardly longitudinally of the burner to the outlet end 19 of the burner, where the tubes are return bent on themselves, as indicated at 20, from which point the tubes extend downwardly and then outwardly for connection into the outlet header 21. Thus there is an incoming pass and an outgoing pass for the cooling water in the tubes 15. These two passes are spaced apart from one another and the oxygen delivering tubes 14 are nested in the space between the passes, with the wall surfaces thereof in close juxtaposition to the wall surfaces of the tubes. Stated in other words, the space between the incoming and outgoing passes to the tubes 15 is desirably such as will just receive the tubes 14. The tubes 14 are preferably slightly larger in diameter than the tubes 15. The tubes 15 thus not only serve to cool the tubes 14 at their inner and outer faces but also, in large part shield the tubes 14 from the heat of the preheated gas passing through the burner passage 16. To complete the shielding of the tubes 14 from such heat, longitudinally extending strips 22 are welded between adjacent tubes 15, as shown in Fig. 3, which extend from the headers to the return bends of the tubes 15 to form with the tubes 15 a wall.

The tubes 14 dead end at the return bends and have their end portions laterally perforated with holes 23.

Certain of the tubes 14 are connected to the header 24 and others to the header 25, which headers, as well as the header 21, are also preferably ring-like, surrounding the body of the burner, the same as the header 18. The headers 24 and 25 are supplied with preheated oxygen from a source not shown, by means of the pipe 26, the delivery end of which is connected to the header 24 and by the branch pipe 27, the delivery end of which is connected into the header 25. Control valves 28 and 29 are located in the line 26, respectively on opposite sides of the point where the branch pipe 27 takes off.

Circular plates or bands 30 are welded to the headers as shown in Fig. 2. The uppermost band 30 is also welded to a flanged coupling member 31 which, in turn, is hermetically coupled to the coupling flange 32, as by a gasket and bolts or a seal weld, and the latter coupling is welded to the band 33 as indicated at 34. This band in turn is welded to the casing 13 of the furnace 7. The lower band 30 is welded to a flanged coupling member 35, which latter is adapted to be connected to the pipe line leading from the source of preheated natural gas. A seal ring 36 is welded to the inlet end portions of the tubes 15 and is welded to the ends of strips 22.

It will be seen from the foregoing that the tubes 14 and 15, the headers 18, 24, 25 and 21, and the bands, flanged couplings and rings described, cooperate to provide an imperforate, gas-tight, pressure withstanding burner body, a large part of which is composed of the tubes 14 and 15. The headers and flanged coupling members constitute strength elements. The spaces intervening between the tubes and those parts, which constitute what might be termed the outer casing for the burner and the spaces between tubes, are filled with heat conducting material 37, such as silicon carbide or high boiling point liquid, and the inlet end of the burner is provided with the refractory insulation 38. Desirably the outer passes of the tubes 15 are formed into a wall by fins or strips 22' welded as shown in Fig. 3, and extending from a point adjacent to the bends to the header 21, whereby the spaces between tubes may be also filled with material 37.

The outlet end of the burner projects freely into the opening 39 in the wall of the furnace 7, with the burner tip desirably projecting somewhat beyond the inner face of the furnace lining (see Figures 1 and 2). It is unnecessary with this design and location to provide a gas-tight connection between the burner proper and the coiled cooling tubes 8' of Fig. 2 because those tubes are welded together and also welded to the inner end of the ring 33 at 40, thus preventing any hot furnace gases from entering the space between the coil tubes 8' and the casing 13.

The oxygen jetting angularly from the holes 23 in the tubes 14 comingles with the natural gas being delivered into the furnace chamber, and to increase the turbulence and the uniformity of mixing of the oxygen with the gas, every so often one of the tubes 15 has its return bends carried radially inward to extend substantially across the path of flow of the gas through the burner, as indicated at 20'. The ends of the tubes 14 which are cooled by those tubes so bent, are also bent inwardly into the return bends 20' as indicated in Fig. 2 and they also are provided with angularly directed holes 23'. The holes 23 and 23' jet the oxygen angularly into the natural gas stream because such holes are located to either side of the respective tube 15. By bending certain of the tubes radially inward, as shown in Figs. 2 and 3, oxygen jets are directed generally toward one another and in a general sense transversely of the moving stream of gas from generally opposite directions, so that there is a high degree of turbulence with substantial uniformity of mixing which is of great advantage in securing uniform and most effective results in the generator. In Fig. 3 I have shown eight of the tubes 15 and of the tubes 14 bent radially inward. This number may be increased as shown in Fig. 4, or decreased to secure the desired turbulence and uniformity of mixing. Instead of providing delivery openings on the tubes 14 at both sides of the tubes, they may be provided at one side only, as shown in Fig. 4, in which a rotary motion is imparted to the natural gas stream and thorough mingling secured.

Still referring to Fig. 2, the tubes 14 are welded to the tubes 15 for a substantial portion of their length at the return bends, as indicated at 42. This secures effective heat transfer and hence effective cooling at this critical point. This also serves to anchor the end portions of the tubes 14 in the return bends of the respective tubes 15, as against relative lateral displacement; and the ends of the tubes 14 and 15 are anchored by their respective headers 18, 24, 25 and 21, as against lateral displacement relative to one another. The tubes however are free to expand and contract lengthwise as a unit.

Cooling water is supplied to the inlet header 18 and flows out from outlet header 21. While the circulation of the cooling water may be independent of the circulation in the boiler, it is advantageous to connect the cooling tubes and the boiler tubes in parallel with the circulation pump or pumps, as diagrammatically indicated in Fig. 2. (In Figure 1, header 18 is connected to header 79 and header 21 to header 82.) This is advantageous as it is desirable to have the cooling water operate at a pressure such that its temperature is the same as the temperature of the oxygen or close thereto, say, for example, at 500° F. if the oxygen is at 600° F. The boiler is also desirably operated at such a pressure. Simplicity is thus obtained by connecting the cooling water system with the circulating pump in parallel with the boiler. (I have used the term "cooling water" to define the cooling medium, but it will be understood that there will ordinarily be a mixture of steam and water and in some cases only steam. Hence, "cooling water" is employed herein in the broad sense of "cooling medium.")

By operating the cooling system at approximately the same temperature as the oxygen or somewhat therebelow as indicated, the expansion and contraction of tubes 14 and 15 are kept substantially uniform in degree and the bends in the tubes, particularly those adjacent to the headers, allow the tubes to expand and contract without detrimental tension or stresses on the welds at the tip end of the burner and on the tube connections with the headers. Furthermore, the casing portion of the body of the burner may expand and contract freely without imposing any substantial stresses on any of the burner tubes. The heat conducting material 37 also tends to bring about uniformity of temperature as between the oxygen tubes and the inner and outer passes of the cooling water tubes and hence uniformity in expansion and contraction. It also serves a useful purpose in equalizing temperatures in starting up the plant.

Having a single burner is an advantage in that it is desirable to keep the openings in the gastight generator which operates under substantial superatmospheric pressure as hereinbefore described, down to a minimum. Notwithstanding that only a single burner is employed of relatively small diameter (approximately 20" to 30" inside diameter), the heat released is so great that steam may be generated in the waste heat boiler at a rate of 500,000 lbs. of steam per hour, more or less as desired. Moreover, the employment of a single burner located at the bottom is advantageous. The casing 13, the lining, and the water wall interposed therebetween, have different temperatures and coefficients of expansion which present difficulties were the burner or burners to be located in the side wall. As shown in Fig. 2, the outlet end of the burner fits freely in the lining and the only connection of the burner with the generator is by means of the flange couplings 31 and 32, the latter of which is connected to the casing 13 by means of the ring 33. Thus no sealing or attachment difficulties are encountered from conditions such as just above indicated.

To provide uniformity of distribution and control of flow through the cooling tubes 15, metering orifices 43 may be provided, one being shown for one of the tubes in Fig. 2. These orifices are removable and replaceable so that it is possible to readily adjust the flow, as desired, by substituting orifices having different sized metering openings.

For flexibility in adjusting the oxygen supply to meet changes in operating conditions such as variation of rate of operation or the like, I have provided the two headers 24 and 25, connected to the oxygen supply as described. In other organizations of the apparatus, a different number (more or less than two) of oxygen headers obviously may be used. By adjusting the valve 28, the total amount of oxygen delivered to the headers may be controlled, and by adjusting the valve 29 any desired proportioning of the oxygen flowing past the valve 28 can be had as between headers 24 and 25. Further control may be had by the adjustable valve means 44 (see Fig. 2) which may be provided in any desired number. By these, the distribution of the oxygen supplied to the various tubes 14 may be controlled. In burners of large size employing oxygen tubes of three or more different shapes (such as the three shapes shown in Fig. 4) it may be desirable to provide an increased number of oxygen headers each connected to tubes of one shape.

The burner described will satisfactorily withstand the severe operating conditions hereinbefore described and is of such character and so associated with the generator that the likelihood of accident through leakage to the exterior is removed.

In the burner of Figs. 2 and 3, the cooling tubes 15 are bent or looped but once. They may be looped a number of times between headers as indicated, for example, in Fig. 5, and in such case the headers 18 and 21 may both be located above or below the oxygen headers 24 and 25. This looping may be taken advantage of to carry the cooling tubes downwardly on the inside as indicated at 100, to protect the refractory lining of the gas inlet.

Referring now to Fig. 6, the burner therein consists of the tube 45 for delivering the natural gas. Within this tube is an oxygen delivery tube 14' which is surrounded on two sides by a looped or return bent cooling tube 15'. In other words, one of the units of the burner of Figs. 2 and 3 is employed. In this construction the upper end of the tube 45 is thoroughly encased by the refractory wall 46 of the furnace 7'. As stated, this burner is useful for small scale operation.

In Fig. 7 the burner is provided with a central tube 47 for the incoming natural gas, this tube being surrounded by units such as previously shown and described consisting of return bent tubes 15' and oxygen delivering tubes 14' arranged annularly in a ring around the tube 47, as shown. Around the tubes is a casing 48. The tip ends of the return bends 15' and the ends of the tubes 14' extend somewhat above the upper end of the tube 47 and the oxygen is delivered with the jets directed toward a point, or tangentially as indicated, to impart a swirling or rotary motion to the gas stream. A pilot tube 49 is desirably associated with the tubes hereinbefore described, as is a tube 50 for thermocouples or radiation pyrometers. The tubes 14', 15', 49 and 50 are welded together as shown to secure, inter alia, effective heat transfer.

In order to be able to effectively use the burner of Fig. 2 as an inspection opening to observe the condition of the furnace and as a means for temporarily or permanently supporting a pilot burner for starting up the plant, I provide the arrangement of Fig. 8 in which a flanged member 51 is provided and adapted to be coupled to the coupling member 35. The member 51 has an inlet 52 for the natural gas and is provided with a detachable bottom 53. When this bottom is removed, access may be had to the interior of the burner and the internal condition of the generator may be observed. This bottom may be utilized to permanently or removably support a pilot 54 for starting. Also since the furnace interior is under high temperature and high superatmospheric pressure, it is impractical to provide transparent observation openings of any kind to observe the furnace interior. Furthermore, the best known thermocouple materials may be inadequate in an atmosphere composed largely of highly heated CO and H₂. Therefore some other means is desirable for continuously providing the operator with an indication of intensity of furnace temperature. I therefore propose to associate with and attach to the detachable bottom 53 a radiation pyrometer which will be in a protected position and yet will be able to "see" the interior of the furnace through the screen formed by the laterally displaced water cooling and oxygen supply tubes. Such an instrument will give an indication of relative intensity of flame temperature and will also indicate whether coke is forming on the burner. Another arrangement would be to place the radiation pyrometer at the base of a silicon carbide tube such as tube 54 of Fig. 8 which would permit direct sighting into the furnace interior.

Referring now to the modifications of Figs. 9, 10 and 11, the oxygen tubes 14'' are provided with a special end closure of relatively thick wall construction and preferably made of an alloy suitable to withstand high temperatures. The end closures are welded to the upper ends of the tubes 14'' as shown at 55 and are housed by and welded to the return bends of the cooling tubes 15''. Where the return bends extend laterally inward, the members 55 take the shape indicated in Fig. 11.

While I have described the oxidant as oxygen, it will be understood that other oxidants may be employed such as air, hydrogen peroxide and the like, whichever is best suited to the particular process or combustion reaction in connection with which the burner is being used. Hence the word "oxygen" is used herein broadly to indicate an oxidant. In this connection, it will be understood that the apparatus shown and described may be useful for purposes other than the conversion of natural gas into other fuels and the like.

I claim:

1. In a burner for systems for converting heated natural gas into gasoline components and like systems having an inlet and an outlet for the gas to be processed, a plurality of cooling water tubes, a plurality of oxygen delivering tubes, said tubes being arranged to extend longitudinally of the burner in closely spaced relation to one another around but spaced from the longitudinal axis of the burner to constitute the wall of the burner to and through which the gas to be processed is delivered, and closure means cooperating with the tubes to seal the wall of the burner, said cooling tubes being return bent on themselves to provide spaced incoming and outgoing passes for the cooling water and said oxygen delivering tubes being nested by and parallel to the tubes in the spaces between said passes, and said oxygen delivering tubes being perforate for oxygen delivery into the gas to be processed.

2. In a burner for systems for converting heated natural gas into gasoline components and like systems having an inlet and an outlet for the gas to be processed, a plurality of cooling water tubes, a plurality of oxygen delivering tubes, said tubes being arranged to extend longitudinally of the burner in closely spaced relation to one another around but spaced from the longitudinal axis of the burner to constitute the wall of the burner to and through which the gas to be processed is delivered, and closure means cooperating with the tubes to seal the wall of the burner, said cooling tubes being return bent on themselves to provide spaced incoming and outgoing passes for the cooling water and said oxygen delivering tubes being nested by and parallel to the tubes in the spaces between said passes being arranged approximately parallel to the axis of the burner, and said oxygen delivering tubes being perforate for oxygen delivery into the gas to be processed.

3. In a burner for systems for converting heated natural gas into gasoline components and like systems having an inlet and an outlet for the gas to be processed, a plurality of cooling water tubes, a plurality of oxygen delivering tubes, said tubes being arranged to extend longitudinally of the burner in closely spaced relation to one another around but spaced from the longitudinal axis of the burner to constitute the wall of the burner to and through which the gas to be processed is delivered, said cooling tubes being return bent on themselves to provide spaced incoming and outgoing passes for the cooling water and said oxygen delivering tubes being nested by and parallel to the tubes in the spaces between said passes, and certain of the cooling tubes having the return bends extending laterally inward of the burner but in laterally spaced relation to one another with the respective oxygen tubes also bent substantially inward.

4. A unit for burners for systems for converting heated natural gas into gasoline components and like systems comprising a cooling water tube rebent on itself to provide spaced incoming and outgoing parallel passes for the cooling water arranged longitudinally of the burner, and an oxygen delivery tube nested by and parallel the water tube in the space between passes of the water tube, and said oxygen delivering tube being perforate to deliver oxygen.

5. In a burner for systems for converting natural gas into gasoline components and like systems, the combination of a series of cooling water tubes arranged around the longitudinal axis of the burner and spaced therefrom but closely spaced in relation to one another to constitute the wall of the burner to and through which the gas to be processed is delivered, said burner wall having an inlet end for receiving the gas under pressure to be processed and an outlet end and said tubes being return bent on themselves to provide incoming and outgoing spaced passes for the cooling water, header means with which the incoming ends of the tubes are connected, header means with which the outgoing ends of the tubes are connected, header means connected to a source of heated oxygen under pressure, tubes connected with said last mentioned header means and nested by and parallel to the cooling tubes in the spaces between the passes of the cooling tubes and perforate to deliver oxygen into the natural gas, and sealing means cooperating with the tubes for completing the body of the burner to make it gas tight save substantially for its inlet and outlet.

6. The burner of claim 5 wherein the cooling water tubes are arranged annularly.

7. The burner of claim 5 wherein the cooling water tubes are arranged annularly and the headers are doughnut-shaped.

8. The burner of claim 5 further including metering orifices located in the inlet header for the water cooling tubes for controlling distribution of water to said tubes.

9. The burner of claim 5 further including metering valve means located in the oxygen header means for controlling distribution of oxygen to the oxygen tubes.

10. The burner of claim 5 wherein the header means connected to the source of oxygen comprises two headers connected in parallel with the source of supply and provided with valve means for controlling distribution.

11. The burner of claim 5 wherein the sealing means includes a casing around the tubes and heat conducting means in the space between the tubes and the casing.

12. The burner of claim 5 characterized by a casing around the tubes and heat conducting means in the space between the tubes and the casing and between tubes, said casing and heat conducting means comprising said sealing means.

13. The burner of claim 5 in which the water cooling tubes are rebent on themselves more than once.

14. The burner of claim 5 wherein said headers are annularly arranged around the longitudinal axis of the burner and the sealing means includes annular casing plates welded to the headers cooperating in forming an outer casing of the wall and constituting strength elements for the burner.

15. In a burner for systems for converting natural gas into gasoline components and like systems, the combination of a series of cooling water tubes arranged around the longitudinal axis of the burner and spaced therefrom but closely spaced in relation to one another to constitute the wall of the burner through and to which the gas to be processed is delivered, said burner having an inlet end for receiving the gas under pressure to be processed and an outlet end and said tubes being return bent on themselves to provide incoming and outgoing spaced passes for the cooling water, header means with which the incoming ends of the tubes are connected, header means with which the outgoing ends of the tubes are connected, header means connected to a source of heated oxygen under pressure, tubes connected with said last mentioned header means and nested by and parallel to the cooling tubes in the spaces between the passes of the cooling tubes and perforate to deliver oxygen into the natural gas, and sealing means cooperating with the tubes for completing the body of the burner to make it gas tight save for the inlet and outlet, certain of the cooling tubes having their return bends projecting laterally inward of the burner but in laterally spaced relation to one another with the respective oxygen tubes also projecting laterally inward.

16. In a burner for systems for converting natural gas into gasoline components and like systems, the combination of a series of cooling water tubes arranged around the longitudinal axis of the burner and spaced therefrom but closely spaced in relation to one another to constitute the wall of the burner to and through which the gas to be processed is delivered, said burner having an inlet end for receiving the gas under pressure to be processed and an outlet end and said tubes being return bent on themselves at the discharge end of the burner to provide incoming and outgoing spaced passes for the cooling water, header means with which the incoming ends of the tubes are connected, header means with which the outgoing ends of the tubes are connected, header means connected to a source of heated oxygen under pressure, tubes connected with said last mentioned header means and nested by and parallel to the cooling tubes in the spaces between the passes of the cooling tubes and adapted to deliver oxygen into the natural gas, and sealing means cooperating with the tubes for completing the body of the burner to make it gas tight save for its inlet and outlet, said oxygen tubes having a plurality of outlets adjacent the return bends, said return bends being located at the outlet end of the burner.

17. In a burner for systems for converting natural gas into gasoline components and like systems, the combination of a series of cooling water tubes arranged around the longitudinal axis of the burner and spaced therefrom but closely spaced in relation to one another to constitute the wall of the burner to and through which the gas to be processed is to be delivered, said burner having an inlet end for receiving the gas under pressure to be processed and an outlet end and said tubes being return bent on themselves at the discharge end of the burner to provide incoming and outgoing spaced passes for the cooling water, header means with which the incoming ends of the tubes are connected, header means with which the outgoing ends of the tubes are connected, header means connected to a source of heated oxygen under pressure, tubes connected with said last mentioned header means and nested by and parallel to the cooling tubes in the spaces between the passes of the cooling tubes and adapted to deliver oxygen into the natural gas, and sealing means cooperating with the tubes for completing the body of the burner to make it gas-tight save for the inlet and outlet, certain of the cooling tubes having their return bends projecting laterally inward of the burner but in laterally spaced relation to one another with the respective oxygen tubes also projecting laterally inward, and the oxygen tubes each having a plurality of outlets adjacent the return bends arranged to deliver oxygen into the gas stream and inwardly in a direction at an angle to said stream, and said return bends being located at the outlet end of the burner.

18. In a burner for systems for converting heated natural gas into gasoline components and like systems having an inlet and an outlet for the gas to be processed, a plurality of cooling water tubes, a plurality of oxygen delivering tubes, said tubes being arranged to extend longitudinally of the burner in closely spaced relation to one another around but spaced from the longitudinal axis of the burner to constitute the wall of the burner to and through which the gas to be processed is delivered, and closure means cooperating with the tubes to seal the wall of the burner, the oxygen delivering tubes being arranged in juxtaposition to the cooling tubes to be cooled by the latter and having delivery openings at the outlet end of the burner directed to deliver oxygen generally laterally into the gas stream and generally tangent to an imaginary circle concentric with the axis whereby to impart rotary motion.

19. In a burner for systems for converting heated natural gas into gasoline components and like systems having an inlet and an outlet for the gas to be processed, a plurality of cooling water tubes, a plurality of oxygen delivering tubes, said tubes being arranged to extend longitudinally of the burner in closely spaced relation to one another around but spaced from the longitudinal axis of the burner and substantially parallel thereto, to constitute the wall of the burner, to and through which the gas to be processed is delivered, and closure means cooperating with the tubes to seal the wall of the burner, the oxygen delivering tubes being arranged in juxtaposition to the cooling tubes to be cooled by the latter and being perforate for oxygen delivery into the gas to be processed.

WARD S. PATTERSON.

References Cited in the file of this patent

UNITED STATES PATENTS

| Number | Name | Date |
|---|---|---|
| 881,100 | Lea | Mar. 3, 1908 |
| 1,707,772 | Robinson | Apr. 2, 1929 |
| 1,731,722 | Meier | Oct. 15, 1929 |
| 1,938,708 | McCutcheon | Dec. 12, 1933 |
| 2,043,867 | Rava | June 9, 1936 |
| 2,145,555 | Robinson | Jan. 31, 1939 |
| 2,221,583 | Hoop | Nov. 12, 1940 |
| 2,293,735 | Hardgrove | Aug. 25, 1942 |
| 2,457,505 | Solem | Dec. 28, 1948 |